US006887145B2

(12) United States Patent
Howe et al.

(10) Patent No.: US 6,887,145 B2
(45) Date of Patent: May 3, 2005

(54) METHOD AND APPARATUS FOR CLEANING AN INTERNAL VOLUME

(76) Inventors: Delmont H. Howe, 5300 S. 17th Ter., Fort Smith, AR (US) 72901; Johnny L. Howe, 514 N. Main St., Mulberry, AR (US) 72947

( * ) Notice: Subject to any disclaimer, the term of this patent is extended or adjusted under 35 U.S.C. 154(b) by 0 days.

(21) Appl. No.: 10/610,358

(22) Filed: Jun. 30, 2003

(65) Prior Publication Data

US 2005/0009459 A1 Jan. 13, 2005

(51) Int. Cl.7 .............................................. A22C 21/00
(52) U.S. Cl. ........................................................ 452/81
(58) Field of Search ................................ 452/173, 123, 452/120, 122; 239/554, 589, 499

(56) References Cited

U.S. PATENT DOCUMENTS

| | | | | |
|---|---|---|---|---|
| 3,803,669 A | * | 4/1974 | Dillon ........................ 452/106 |
| 4,106,161 A | * | 8/1978 | Niccolls ...................... 452/106 |
| 4,557,016 A | * | 12/1985 | Markert ...................... 452/173 |
| 4,876,767 A | * | 10/1989 | Harben et al. .............. 452/106 |
| 5,041,054 A | * | 8/1991 | van den Nieuwelaar et al. ........................... 452/123 |
| 5,181,878 A | * | 1/1993 | Bekkers ...................... 452/109 |
| 6,083,095 A | * | 7/2000 | Simmons .................... 452/123 |
| 6,093,093 A | * | 7/2000 | Mostoller et al. ........... 452/173 |
| 6,213,862 B1 | * | 4/2001 | Martin et al. ............... 452/118 |
| 6,220,952 B1 | * | 4/2001 | Taylor et al. ............... 452/173 |

* cited by examiner

Primary Examiner—Thomas Price
(74) Attorney, Agent, or Firm—Gardere Wynne Sewell LLP

(57) ABSTRACT

A method and apparatus for cleaning an internal surface such as a body cavity of a poultry carcass. In one embodiment, a manifold body is provided having a first axis therein, a first surface disposed about and centered on the first axis, and a first offset port having a principal axis orthogonal to, but offset from, the first axis of the manifold body. A central ring is disposed about the manifold body having a central axis aligned to the first axis of the manifold body, freely rotatable with respect to the manifold body about the central axis. A cap ring secures the central ring in place about the manifold body. A fluid is diverted through the offset port and against the inner surface of the central ring at an angle so as to impart rotary momentum to the central ring. At least a portion of the fluid passing through the offset port is directed across the fluid diversion surfaces so as to direct the portion of the fluid at the internal surface to be cleaned.

15 Claims, 4 Drawing Sheets

METHOD AND APPARATUS FOR CLEANING AN INTERNAL VOLUME

CROSS-REFERENCE TO RELATED FILINGS

The invention disclosed herein was earlier disclosed in Disclosure Document 510,370 titled "Spray Head," which was received in the U.S. Patent and Trademark Office on Apr. 22, 2002.

BACKGROUND OF THE INVENTION

The present invention relates generally to cleaning, and in particular to a water spray head for spray cleaning surfaces of a cavity, particularly a carcass and more particularly a poultry carcass.

The present invention is described in connection with the cleaning of poultry carcasses, as an example. The method of removing internal organs from poultry essentially has not changed since early fowl hunting. Modern processing plants have simply automated the process, and the disassembly of the poultry carcass usually occurs after it has been hung on a moving line of shackles. The standard method is that the poultry is humanely slaughtered and the feet, feathers and heads are removed. Then a cut is made through the abdominal wall below the vent. This is done while the bird is retained in shackles for automated handling, either hung upside down (chicken broilers) or in a three-point suspension (turkeys). Usually a hole is precut in the abdominal wall, and sometimes the poultry or other fowl is hung upside down, and a spoon is used for automatically removing the viscera.

The present methods, in which the abdominal wall is opened, tend to risk contamination by slicing, rupturing, or even squeezing the intestines so that intestinal matter or fecal matter will leak and contaminate the bird. Methods of removing the vent, without damaging the intestines have been advanced, but still the percentage of birds contaminated is substantial. Individual inspection devices have also been advanced. In certain methods a shackle line is designed to eliminate the necessity for the inspector to touch the birds during inspection. Contamination from one bird will not be easily transferred to another. Again, in this instance, the abdominal cavity is open, and the internal organs are inspected through the rear of the bird.

Automated devices for eviscerating poultry or other birds utilizing suspended shackle systems and automated spoons are sometimes used. The known methods cause problems and it is disadvantageous if the entrails or viscera hangs downwards over the back of the bird, as will sometimes happen in a system where the birds are inverted and the viscera is removed through an upwardly facing abdominal cavity opening. In certain designs, the spine is held horizontally during evisceration.

Regardless of the type of evisceration method or methods employed, it is important to ensure that the internal cavity of an eviscerated poultry carcass is well-washed during or after evisceration and prior to final processing, in order to minimize the chance of contamination of the other portions of the bird by fecal matter.

SUMMARY OF THE INVENTION

In a first embodiment, the present invention is a method of cleaning an internal surface. A manifold body is provided having a first axis therein, a first surface disposed about and centered on the first axis, and a first offset port having a principal axis orthogonal to, but offset from, the first axis of the manifold body. A central ring is disposed about the manifold body having a central axis aligned to the first axis of the manifold body, freely rotatable with respect to the manifold body about the central axis. A cap ring secures the central ring in place about the manifold body. A fluid is diverted through the offset port and against the inner surface of the central ring at an angle so as to impart rotary momentum to the central ring. At least a portion of the fluid passing through the offset port is directed across the fluid diversion surfaces so as to direct the portion of the fluid at the internal surface to be cleaned.

In a second embodiment, the present invention is a second method for cleaning an internal surface. The method involves a manifold body having a first axis therein, a first surface disposed about and centered on the first axis, and a first offset port having a principal axis orthogonal to, but offset from, the first axis of the manifold body. A central ring is disposed about the manifold body in such a manner as to be freely rotatable with respect to the manifold body about the central axis. The central ring incorporates a central axis aligned to the first axis of the manifold body, a first end, a second end, at least one inner surface, at least one outer surface, a first fluid diversion surface disposed at the first end and adjacent both the inner surface and outer surface and mated to the first surface of the manifold body, a second fluid diversion surface disposed at the second end and adjacent both the inner surface and outer surface A cap ring having a central axis and a first surface is disposed on the manifold body. The central axis is aligned to the first axis of the manifold body, and the first surface is mated to the second fluid diversion surface of the central ring. A fluid is passed through the offset port and against the inner surface of the central ring at an angle so as to impart rotary momentum to the central ring and at least a portion of the fluid passing through the at least one offset port is diverted across the fluid diversion surfaces so as to direct the portion of the fluid at the internal surface to be cleaned.

In a third embodiment, the present invention is an apparatus for cleaning an internal surface. The apparatus comprises a manifold body having a principal central axis, a principal center plane disposed generally orthogonal to the principal central axis and positioned at approximately the center of the center section, a principal radial axis disposed within the principal center plane and intersecting the principal central axis, and a principal axial plane generally aligned to the principal central axis and generally orthogonal to the principal radial axis. A first offset port extends from a first face of the principal axial plane along a principal axis lying in the principal center plane and parallel to the principal radial axis, offset from the principal radial axis a first distance in a first direction. A second offset port extends from a second face of the principal axial plane along a principal axis lying in the principal center plane and parallel to the principal radial axis, offset from the principal radial axis the first distance in a second direction opposite the first direction.

The apparatus further incorporates a central ring having a principal central axis generally aligned to the principal central axis of the manifold body, a principal central plane generally aligned to the principal center plane of the manifold body, at least one inner surface, a first fluid diversion surface having a generally-conical profile disposed at a first end of the inner surface, and a second fluid diversion surface having a generally-conical profile disposed at a second end of the inner surface.

BRIEF DESCRIPTION OF THE DRAWINGS

For more complete understanding of the features and advantages of the present invention, reference is now made to the detailed description of the invention along with the accompanying figures, in which.

DETAILED DESCRIPTION OF THE INVENTION

While the making and using of various embodiments of the present invention are discussed in detail below, it should be appreciated that the present invention provides many applicable inventive concepts that may be embodied in a wide variety of specific contexts. The specific embodiments discussed herein are merely illustrative of specific ways to make and use the invention and do not delimit the scope of the invention. Various modifications and combinations of the illustrative embodiments, as well as other embodiments of the invention, will be apparent to persons skilled in the art upon reference to the description. It is therefore intended that the appended claims encompass any such modifications or embodiments.

Figure 1:
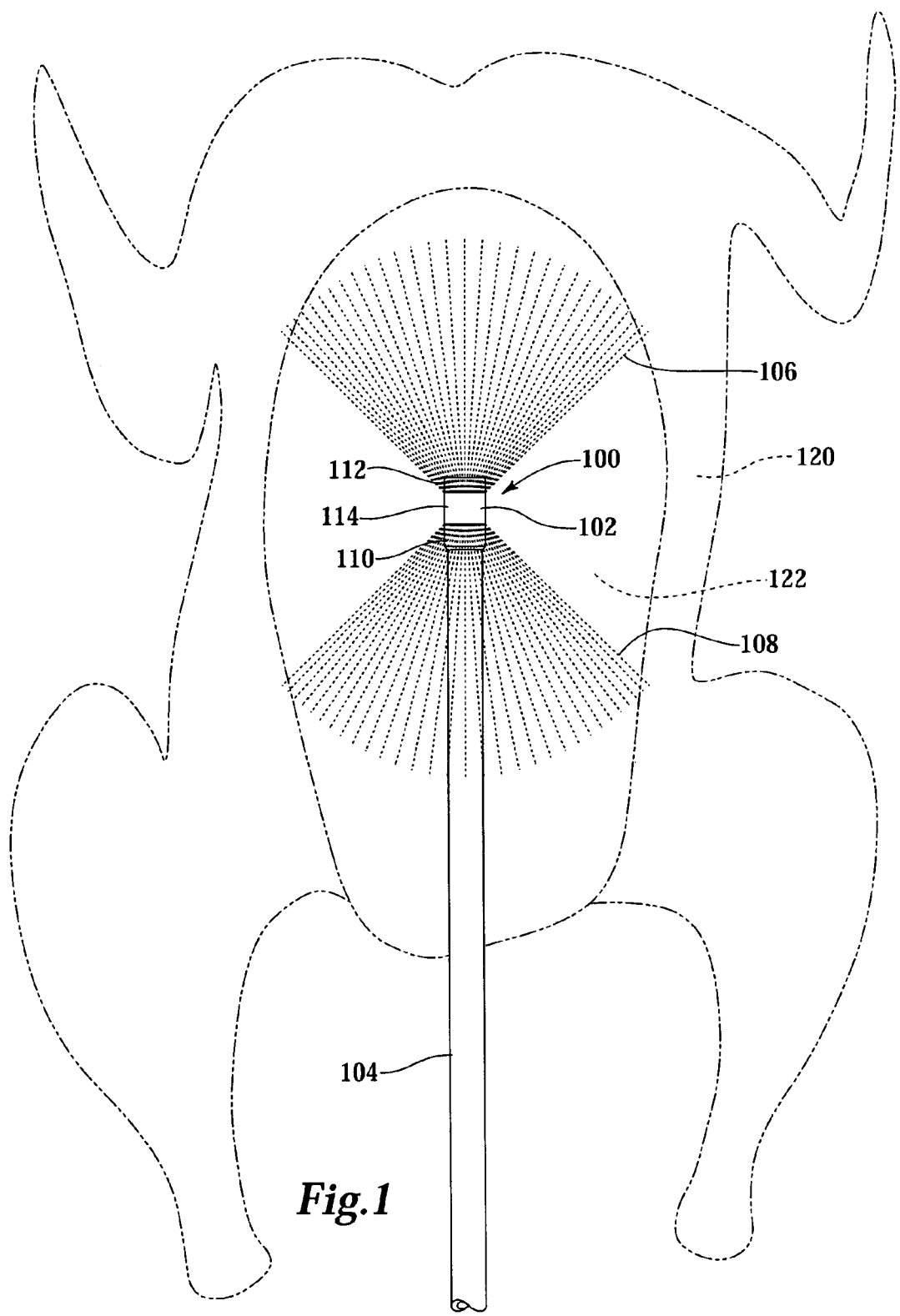
FIG. 1 depicts a side view of a spray assembly according to one embodiment of the present invention disposed in and cleaning surfaces of a cavity of a poultry carcass.
Figure 2:
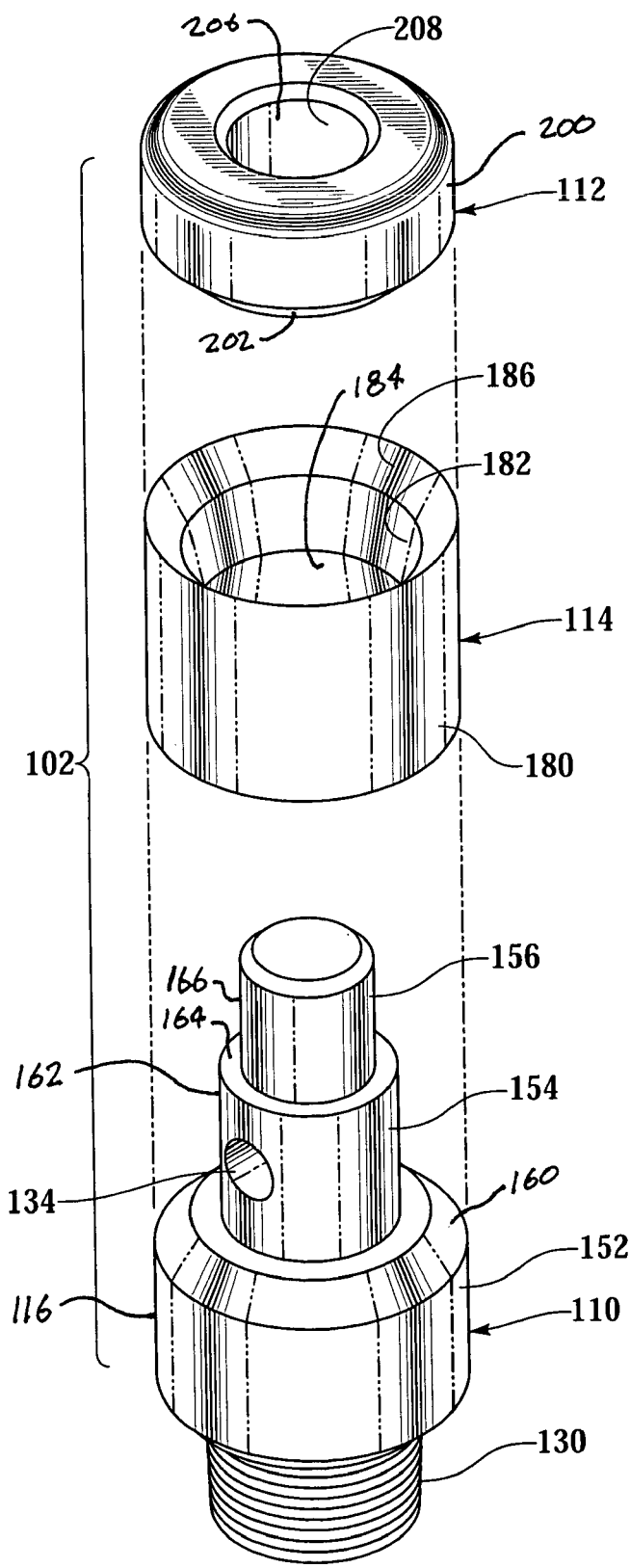
FIG. 2 depicts an exploded isometric view of a spray head suitable for use in the spray assembly of FIG. 1.
Figure 3:
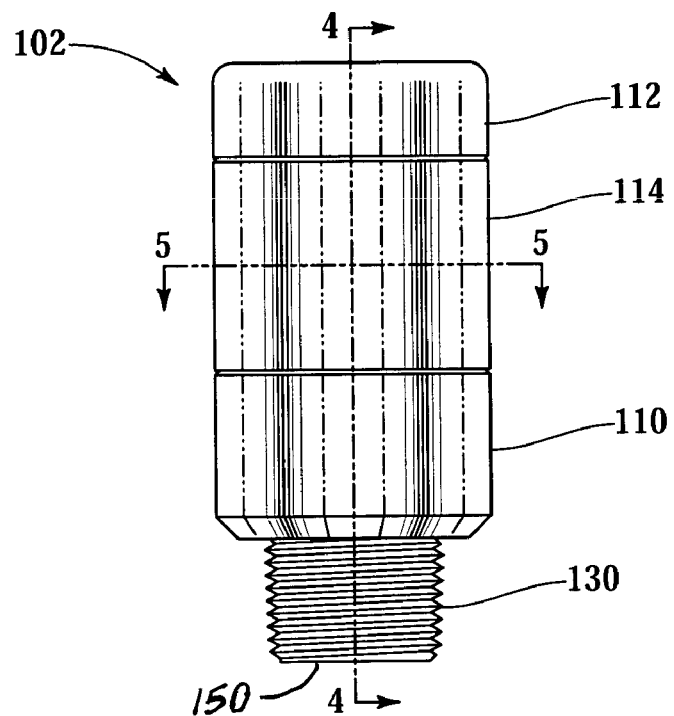
FIG. 3 depicts a side view of the spray head of FIG. 2 as it appears when assembled.
Figure 4:
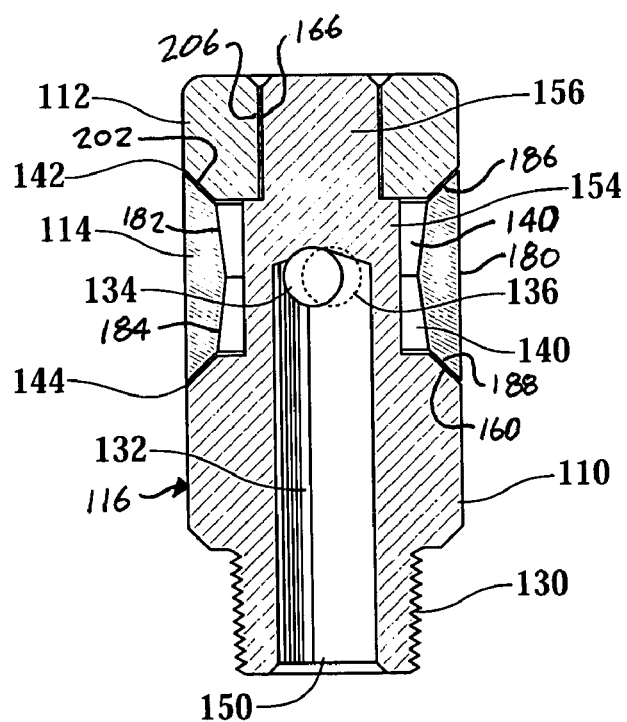
FIG. 4 depicts a section view of the spray head of FIGS. 2 and 3 taken along line 4—4 of FIG. 3.
Figure 5:
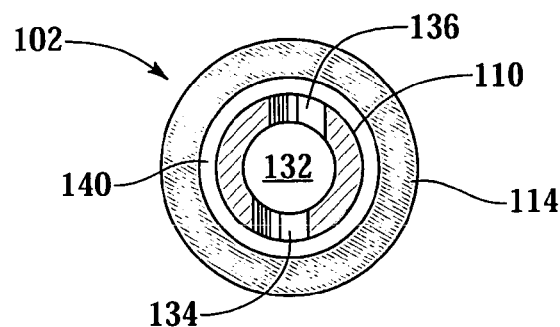
FIG. 5 depicts a section view of the spray head of FIGS. 2 and 3 taken along line 5—5 of FIG. 3.
Figure 6:
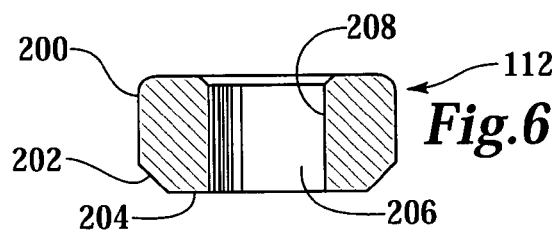
FIG. 6 depicts a section view taken along line 4—4 of FIG. 3 of the cap ring of the spray head as it appears apart from the assembly.
Figure 7:
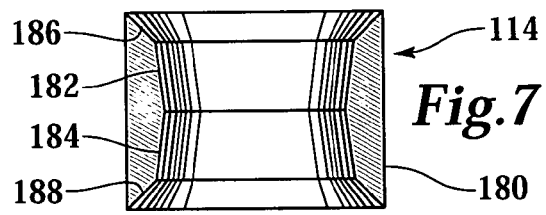
FIG. 7 depicts a section view taken along line 4—4 of FIG. 3 of the center ring of the spray head as it appears apart from the assembly.
Figure 8:
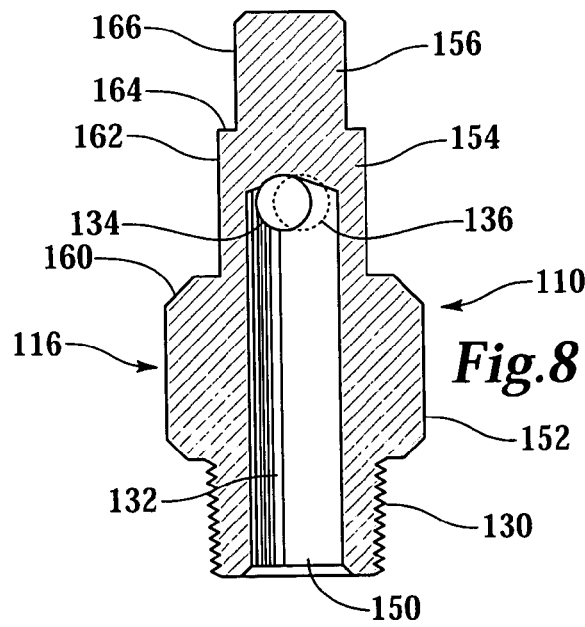
FIG. 8 depicts a section view taken along line 4—4 of FIG. 3 of the manifold coupling of the spray head as it appears apart from the assembly.

As seen in FIG. 1, a spray assembly 100 includes a spray head 102 fitted to the end of a pipe 104. Pressurized water in the pipe 104 exits through the spray head 102 in a manner to form an upper spray pattern 106 and a lower spray pattern 108. The exact shape of the spray patterns 106 and 108 will be determined by the characteristics of the shapes of the surfaces of the components making up spray head 102, which include manifold body 110, cap ring 112 and center ring 114. It can be seen in FIGS. 1 and 2 that manifold body 110 and cap ring 112 together retain center ring 114, as will be described in more detail below.

FIG. 1 shows spray assembly 100 as it is used for cleaning an internal surface, in this case the internal surface 122 delimiting the abdominal cavity 124 of a chicken 120. It will, of course, be appreciated by those of skill in the art that spray assembly 100 may be employed for the cleaning of a wide range of surfaces of cavities, and that abdominal cavity 124 of chicken 120 is presented only for the purpose of illustration of the method of the present invention.

Depending on the specific application, spray assembly 100 may be set up to be spraying as it is entering the abdominal cavity 124, or it may be set up to be first inserted, and then pressurized. Depending on the application, spray assembly 100 may be moved axially while spraying or radially while spraying, and the orientation may be changed while spraying. Position, velocity, orientation and water pressure may all be varied as appropriate in order to maximize the effectiveness of the cleaning process.

The construction of spray head 102 can be seen more clearly in FIGS. 2–6, wherein manifold body 110 is shown aligned to cap ring 112 and center ring 114. Manifold body 110 incorporates a threaded shank 130 at its base having an inlet 150 at its base end to facilitate connection of central port 132 to pipe 104. Central port 132, in turn feeds offset ports 134 and 136, which in turn together feed intermediate volume 140 between the manifold body 110 and the central ring 114.

Adjacent to threaded shank 130, manifold body 110 incorporates an intermediate section 152 disposed about central port 132 and having a conic face 160 at its upper end. A central manifold section 154, having a cylindrical outer surface 162, is disposed adjacent to intermediate section 152. Although outer surface 162 is shown having a cylindrical outer profile for simplicity, those of skill in the art will recognize that a wide variety of shapes may be employed for the outer profile of surface 162. These may include, for example, multiple conical sections, constant radius curves, variable radius curves, parabolic, hyperbolic, or circular profiles, or any combination of the above, without departing from the spirit and scope of the present invention.

The upper end of central manifold section 154 is bounded by a shoulder 164. Adjacent to shoulder 164 at the upper end of central manifold section 154 is cap interface section 156 having an outer surface 166 having a principal diameter smaller than outer surface 162 of central manifold section 154 so as to form shoulder 164. In certain embodiments, all or a portion of cap interface section 156 may be threaded. In other embodiments, cap interface section 156 may be cylindrical and sized for a press fit or other fit to cap ring 112.

Generally-toroidal center ring 114 is disposed about, and centered on, central manifold section 154. In the embodiment shown, center ring 114 includes a generally-cylindrical outer surface 180. Center ring 114 includes two inner surfaces 182 and 184, each of which has a generally-conical inner profile. Those of skill in the art will appreciate that there is nothing in the nature of the invention restricting the profile of the inner surfaces 182 and 184 of the center ring 114 to a pair of conic sections. In alternate embodiments, a single cylindrical inner surface may be employed, or a more complex shape, such as a profile having one or more surfaces having a compound curvature may be employed, alone or in combination with one or more conical profiles.

Disposed at the ends of center ring 114 are fluid diversion surfaces 186 and 188. Fluid diversion surfaces 186 and 188 guide and direct the fluid passing from intermediate volume 140 to the surface to be cleaned. In the embodiment shown, a pair of generally-conical fluid diversion surfaces 186 and 188 is shown, but as with inner surface 182 and 184, there is nothing within the spirit and scope of the present invention restricting fluid diversion surfaces 182 and 184 to this shape. In alternate embodiments, a single cylindrical inner surface may be employed, or a more complex shape, such as a profile having one or more surfaces having a compound curvature may be employed, alone or in combination with one or more conical profiles.

Cap ring 112 has a generally-toroidal shape having an outer surface 200, a conic face 202, a lower surface 204, and an inner bore 206 forming an inner surface 208. Conic face 202 is profiled to mate with the upper fluid diversion surface 186 of the center ring, while lower surface 204 is shaped to register against shoulder 164 of the manifold body 110 and inner surface 208 is shaped to mate with surface 166 of the manifold body 110. If the cap ring interface section 156 of the manifold body 110 is threaded in whole or in part, then inner surface 208 will be threaded with a mating thread. Similarly, if cap ring interface section 110 is designed for a press or a shrink fit with cap ring 112, inner surface 208 should be shaped and sized accordingly.

In operation, cleaning fluid, which may be, for example, water, flows into the inlet 150 of the central port 132. The cleaning fluid flows through the central port 132 to the offset ports 134 and 136, and then into the intermediate volume 140, FIG. 4, between the manifold body 110 and the center ring 114. Owing to the offset positioning of the offset ports 134 and 136, fluid exiting the offset ports 134 and 136 will impinge on the inner surfaces 182 and 184 of the center ring 114 at angles to the vector normals of the inner surfaces 182 and 184 at the point of impingement.

Although the vector component of the fluid flow normal to the inner surfaces 182 and 184 will be resisted by the structure of the center ring 114 and will therefore result in no net motion, the vector component of the fluid impinging on the inner surfaces 182 and 184 tangent to the inner surfaces 182 and 184 will tend to impart a torque on the center ring 114. The magnitude of the torque will vary depending on the viscosity of the fluid, the density of the fluid, the velocity and overall flow rate of the fluid stream exiting the offset ports 134 and 136, the angle of impingement, and the surface characteristics of the inner surfaces 182 and 184 of the center ring 114. In certain embodiments, the inner surfaces 182 and 184 may be textured to enhance the magnitude of the mechanical energy imparted to the center ring 114.

Fluid disposed in the intermediate volume 140 under pressure will be forced into the upper conical gap 142 formed between fluid diversion surface 186 and conical face 202 and into the lower conical gap 144 formed between fluid diversion surface 188 and conical face 160. Where the conical gaps 142 and 144 are relatively small and the pressure within intermediate volume 140 is relatively large, the velocity, and therefore the kinetic energy, of the fluid passing through conical gaps 142 and 144 will be relatively high. Under these circumstances, two relatively high-speed, high-energy generally conical streams of fluid will be generated for the washing of a surface. Although the center ring 114 floats freely between conical face 160 and conical face 202, fluid dynamic effects will tend to equalize the spacing of the conical gaps 142 and 144. The spinning of the center ring 114 will tend to equalize out local discontinuities or imperfections caused by manufacturing processes or by residue build-up. The spinning action of center ring 114 will also tend to reduce clogging of the apparatus.

While this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for cleaning surface defining a cavity, the method comprising the steps of:
   providing a manifold body having a first axis therein and first and second outer conical fluid diversion surfaces;
   providing a ring disposed about the manifold having at least one inner surface, at least one outer surface, first and second inner conical fluid diversion surfaces facing the first and second outer conical fluid diversion surfaces, respectively, and adjacent both the inner surface and outer surface and a central axis aligned to the first axis of the manifold body, secured to the manifold body in such manner as to be freely rotatable with respect to the manifold body about the central axis;
   providing a first offset port in the manifold body having a principal axis substantially orthogonal to the first axis of the manifold body such that the principal axis of the first offset port intersects the inner surface of the central ring at an angle;
   passing a fluid through the first offset port and against the inner surface of the central ring at an angle so as to impart rotary momentum to the central ring;
   passing at least a portion of the fluid passing through the first offset port between the inner and outer fluid diversion surfaces; and
   directing the portion of the fluid passing between the fluid diversion surfaces at the surface to be cleaned.

2. The method of claim 1 further comprising the step of providing a second offset port disposed 180 degrees from the first offset port about the first axis of the manifold body.

3. The method of claim 2 including:
   providing the two fluid diversion surfaces on the central ring at opposite ends of the central ring along the central axis.

4. A method for cleaning an internal surface delimiting a cavity, the method comprising the steps of:
   providing a manifold body having a first axis therein, a first outer fluid diversion surface disposed about and centered on the first axis, and a first offset port having a principal axis orthogonal to, but offset from, the first axis of the manifold body;
   providing a central ring having a central axis aligned to the first axis of the manifold body, a first end, a second end, at least one inner surface, at least one outer surface, a first inner fluid diversion surface disposed at the first end and adjacent both the inner surface and outer surface and mated to the first outer fluid diversion surface of the manifold body, a second inner fluid diversion surface disposed at the second end and adjacent both the inner surface and outer surface, and freely rotatable with respect to the manifold body about the central axis;
   providing a cap ring having a central axis aligned to the first axis of the manifold body, and a first surface mated to the second generally-conical fluid diversion surface of the central ring;
   inserting the manifold body, central ring, and cap ring to the cavity;
   passing a fluid through the offset port and against the inner surface of the central ring at an angle so as to impart rotary momentum to the central ring; and
   passing at least a portion of the fluid passing through the at least one offset port between the facing fluid diversion surfaces; and
   directing the portion of the fluid at the internal surface to be cleaned.

5. The method of claim 4 further comprising the step of providing a second offset port disposed 180 degrees from the first offset port about the first axis of the manifold body.

6. The method of claim 4 wherein the two fluid diversion surfaces on the central ring have generally conical profiles.

7. The method of claim 6 wherein the conical profiles conform to an angle of approximately 45 degrees from the first axis of the manifold body.

8. The method of claim 4 wherein at least one inner surface of the central ring is textured.

9. The method of claim 4 wherein there are two inner surfaces of the central ring, and wherein both inner surfaces are conical sections.

10. The method of claim 4 wherein each of the two inner fluid diversion surfaces faces a mating surface having a generally-conical profile.

11. An apparatus for cleaning an internal surface, the apparatus comprising:
a manifold body having a principal central axis and at least one outer fluid diversion surface;
a first offset port in said body extending from a first face of a principal axial plane along a principal axis lying in a principal center plane and parallel to a principal radial axis, offset from the principal radial axis a first distance along a vector normal to the principal central axis of the manifold body;
the principal center plane disposed generally orthogonal to the principal central axis and positioned at approximately the center of the center section;
the principal radial axis disposed within the principal center plane and intersecting the principal central axis;
the principal axial plane generally aligned to the principal central axis and generally orthogonal to the principal radial axis;
a second offset port extending from a second face of the principal axial plane along a principal axis lying in the principal center plane and parallel to the principal radial axis, offset from the principal radial axis the first distance along a second vector coaxial with, and having an opposite sense to, the first vector;
a central ring having a principal central axis generally aligned to the principal central axis of the manifold body, a principal central plane generally aligned to the principal center plane of the manifold body, at least one inner surface,
a first inner fluid diversion surface having a generally-conical profile disposed at a first end of the inner surface facing an outer fluid diversion surface in the manifold body and separated therefrom by a first fluid diversion gap;
a second inner fluid diversion surface having a generally-conical profile disposed at a second end of the inner surface; and
a cap ring, having a central axis aligned to the first axis of the manifold body and a first outer fluid diversion surface facing the second inner fluid diversion surface of the central ring and separated therefrom by a second fluid diversion gap.

12. The apparatus of claim 11 wherein each of the two fluid diversion surfaces faces a mating surface having a generally-conical profile.

13. The apparatus of claim 11 wherein the conical profiles conform to an angle of approximately 45 degrees from the first axis of the manifold body.

14. The apparatus of claim 11 wherein at least one inner surface of the central ring is textured.

15. The apparatus of claim 11 wherein there are two inner surfaces of the central ring, and wherein both inner surfaces are conical sections.

* * * * *